(12) United States Patent
Hsieh et al.

(10) Patent No.: US 8,294,487 B2
(45) Date of Patent: Oct. 23, 2012

(54) CONFIGURATION SETTING DEVICE OF INTEGRATED CIRCUIT AND THE CONFIGURATION SETTING METHOD THEREOF

(75) Inventors: Meng-Han Hsieh, HsinChu (TW); Chi-Shun Weng, HsinChu (TW); Chien-Chih Chen, HsinChu (TW)

(73) Assignee: Realtek Semiconductor Corp., Hsinchu (TW)

( * ) Notice: Subject to any disclaimer, the term of this patent is extended or adjusted under 35 U.S.C. 154(b) by 1313 days.

(21) Appl. No.: 11/944,077

(22) Filed: Nov. 21, 2007

(65) Prior Publication Data

US 2008/0119151 A1 May 22, 2008

(30) Foreign Application Priority Data

Nov. 22, 2006 (TW) ................................ 95143195 A

(51) Int. Cl.
*H03K 17/16* (2006.01)
*H03K 19/003* (2006.01)
*H01L 25/00* (2006.01)

(52) U.S. Cl. ......................................... 326/31; 327/565
(58) Field of Classification Search .................. 326/31, 326/37–41; 327/564–566; 713/1, 100
See application file for complete search history.

(56) References Cited

U.S. PATENT DOCUMENTS

| 6,441,669 | B2 * | 8/2002 | Ooishi ..................... 327/308 |
| 6,831,479 | B2 | 12/2004 | Lo |
| 7,132,849 | B2 * | 11/2006 | Tucker et al. .................. 326/38 |
| 7,557,603 | B2 * | 7/2009 | Pan .................................. 326/30 |
| 2004/0257122 | A1 * | 12/2004 | Mori ................................ 327/78 |
| 2008/0186055 | A1 * | 8/2008 | Chen et al. ..................... 326/38 |

FOREIGN PATENT DOCUMENTS

| CN | 101093992 A | 12/2007 |
| TW | 094107920 | 9/2006 |

* cited by examiner

*Primary Examiner* — Shawki Ismail
*Assistant Examiner* — Dylan White

(57) ABSTRACT

The present invention provides an configuration setting device of integrated circuit and the configuration setting method thereof, in which the configuration setting device comprises a signal receiving terminal, a voltage output unit coupled to the signal receiving terminal, and a detector coupled to the signal receiving terminal. The signal receiving terminal is used to receive the input signal at the outer of the integrated circuit, and the voltage output unit generated at the inner of the integrated circuit is used to output a voltage signal based on the enable signal, and the detector is used to detect a level at the signal receiving terminal to output a configuration signal; wherein, the signal level generated at the signal receiving terminal is determined by the input signal and the voltage signal.

15 Claims, 6 Drawing Sheets

CONFIGURATION SETTING DEVICE OF INTEGRATED CIRCUIT AND THE CONFIGURATION SETTING METHOD THEREOF

CROSS-REFERENCES TO RELATED APPLICATIONS

This non-provisional application claims priority under 35 U.S.C. §119(a) on Patent Application No(s). 095143195 filed in Taiwan, R.O.C. on Nov. 22, 2006, the entire contents of which are hereby incorporated by reference.

FIELD OF INVENTION

The present invention relates to an integrated circuit, and more specifically to an configuration setting device of integrated circuit and the configuration setting method thereof.

BACKGROUND

Generally speaking, each integrated circuit (IC) could provide multiple operation modes. These operation modes of the integrated circuit are always completed configured during the power on or button reset, so as to ensure the correct operation mode of the integrated circuit to be operating. Because the configurations are to be determined during power on period, it is hard to use the software or firmware manner to adjust. In the conventional integrated circuit design, the pins used for executing configuration could only be used to receive the configuration signal during configuration setting of integrated circuit, and could not provide for application of other functions. Thus, when the operation modes of integrated circuit are increased, the pins of integrated circuit would be increased accordingly in response to the design of operation mode. Therefore, how to reduce the number of pins required for setting the configuration of integrated circuit would still be the targets of development by the engineers. The related techniques and research could be referred to U.S. Pat. No. 6,831,479 B2, and R.O.C. Patent Publication No. 200633381, and the like.

SUMMARY

One object of the present invention is to provide an configuration setting device of integrated circuit, and the configuration setting method thereof, which could reduce the number of pins required for configuration setting of integrated circuit.

One object of the present invention is to provide an configuration setting device of integrated circuit, and the configuration setting method thereof, which could reduce the resistor providing supply voltage or ground voltage.

One object of the present invention is to provide an configuration setting device of integrated circuit, and the configuration method thereof, which could reduce the manufacturing cost of integrated circuit.

The configuration setting device of integrated circuit disclosed in the present invention comprises a signal receiving terminal, a voltage output unit, and a detector. The signal receiving terminal is coupled with the voltage output unit and the detector. The signal receiving terminal is used to receive the input signal from the outer of the integrated circuit; the voltage output unit is used to output a voltage signal at the inner of the integrated circuit according to the enable signal; and, the detector is used to detect the signal level at the signal receiving terminal, and output a configuration signal according to the signal level at the signal receiving terminal; wherein, the signal level at the signal receiving terminal is determined by the input signal and the voltage signal. Herein, the input signal may be a floating signal or a non-floating signal, the non-floating signal such as a clock signal, a high level signal, a low level signal or a level conversion signal. When the input signal is a floating signal, the signal level at the signal receiving terminal is corresponding to the level of voltage signal, that is, the detector would output the configuration signal according to the voltage signal. When the input signal is a non-floating signal, the signal level at the signal receiving terminal is corresponding to the level of the input signal, that is, the detector would output the configuration signal according to the input signal.

The features and implementations relating to the present invention would be detailed described with the preferred embodiments associated with figures as follows.

DETAILED DESCRIPTION

Hereinafter, the content of the present invention would be detailed described with embodiments, and with figures as assistant explanation. The reference numbers in the description would be referred to symbols in figures.

Figure 1:
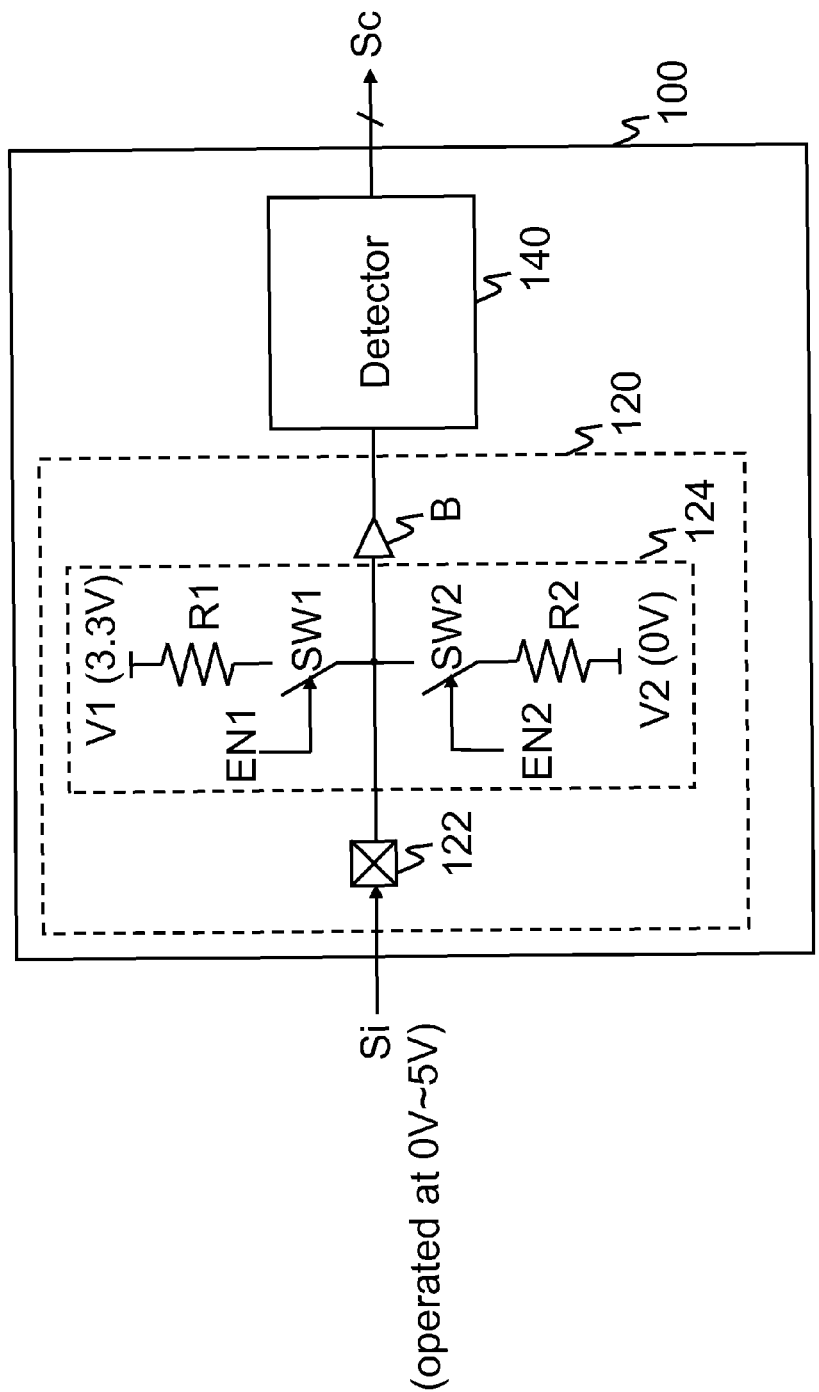
FIG. 1 is a block diagram of configuration setting device of integrated circuit according to an embodiment of the present invention.

Referring to FIG. 1, it shows an configuration setting device 100 of integrated circuit according to an embodiment of the present invention, which comprises a pad 120 and a detector 140; in which each pad 120 includes a signal receiving terminal 122 and a voltage output unit 124 embedded in the pad 120. (original) The signal receiving terminal 122 and the voltage output unit 124 are coupled with each other, in which the signal receiving terminal 122 is used to receive an input signal Si at the outer of integrated circuit, and the voltage output unit 124 is used to output a first voltage signal V1 or a second voltage signal V2 based on an enable signal EN1 or an enable signal EN2 at the inner of integrated circuit. Each pad 120 is coupled to a detector 140, and the detector 140 is used to detect the signal level at the signal receiving terminal 122 to output a configuration signal, in which the signal level of the signal receiving terminal 122 is determined or mixed by the input signal and the voltage signal at the same time. In other words, the detector 140 could detect the input signal Si or the voltage signal (quasi V1 or V2) to output the configuration signal Sc therewith. Herein, the input signal Si may be a floating signal or a non-floating signal, the non-floating signal such as a clock signal, a high level signal, a low level signal, or a level conversion signal. When the input signal Si is a floating signal, the signal level generated at the signal receiving terminal 122 is corresponding to the level of the voltage signal V1 or V2, that is, the detector 140 would output the configuration signal based on the voltage signal V1 or V2. When the input signal Si is a clock signal, a high level signal, a low level signal or a level conversion signal, the signal level at the signal receiving terminal 122 is corresponding to the level of the input signal Si, that is, the detector 140 would output the configuration signal Sc based on the input signal Si. Herein, the input signal Si is operating within the first voltage range, and the voltage signals V1, V2 are operating within the second voltage range, and the first voltage range is larger than the second voltage range. For example, the first voltage range could be operated at 0V-5V and the second voltage range could be operated at 0~3.3 V. But it is noticed that the present invention is not limited by these ranges.

Accordingly, as shown in FIG. 1, each pad 120 could further comprise a buffer B. The input of the buffer B is coupled to the signal receiving terminal 122 and the voltage output unit 124, and the output terminal is coupled with the detector 140 for buffering the signal level at the signal receiving terminal 122, and outputs the received input signal Si or the voltage signal to the detector 140. The voltage output unit 124 comprises: a first resistor R1, a first switch SW1, a second resistor R2, and a second switch SW2. The first switch SW1 is coupled between the signal receiving terminal 122 and the first resistor R1, and the second switch SW2 is coupled between the signal receiving terminal 122 and the second resistor R2, and the two switches are used to whether to provide a voltage signal controlled by an enable signal; wherein, the first switch SW1 and the second switch SW2 could be implemented with transistors. For example, the first switch SW1 is used to determine whether to output a first voltage signal V1 to the detector 140 based on the first signal EN1, and the second switch SW2 is used to determine whether to output a second voltage signal V2 to the detector 140 based on the second signal EN2. And, the voltage signals V1, V2 outputted by the voltage output unit 124 are a weak high voltage and a weak low voltage, respectively. Thus, when there is no input signal Si (that is, the signal receiving terminal 122 is at floating state, and the input signal Si is a floating signal), the enable signal could control the first switch SW1 or the second switch SW2, and the outputted voltage signal V1 or voltage signal V2 is a weak voltage, but not strong voltage, and the detailed operation theory is described as follows.

Figure 2:
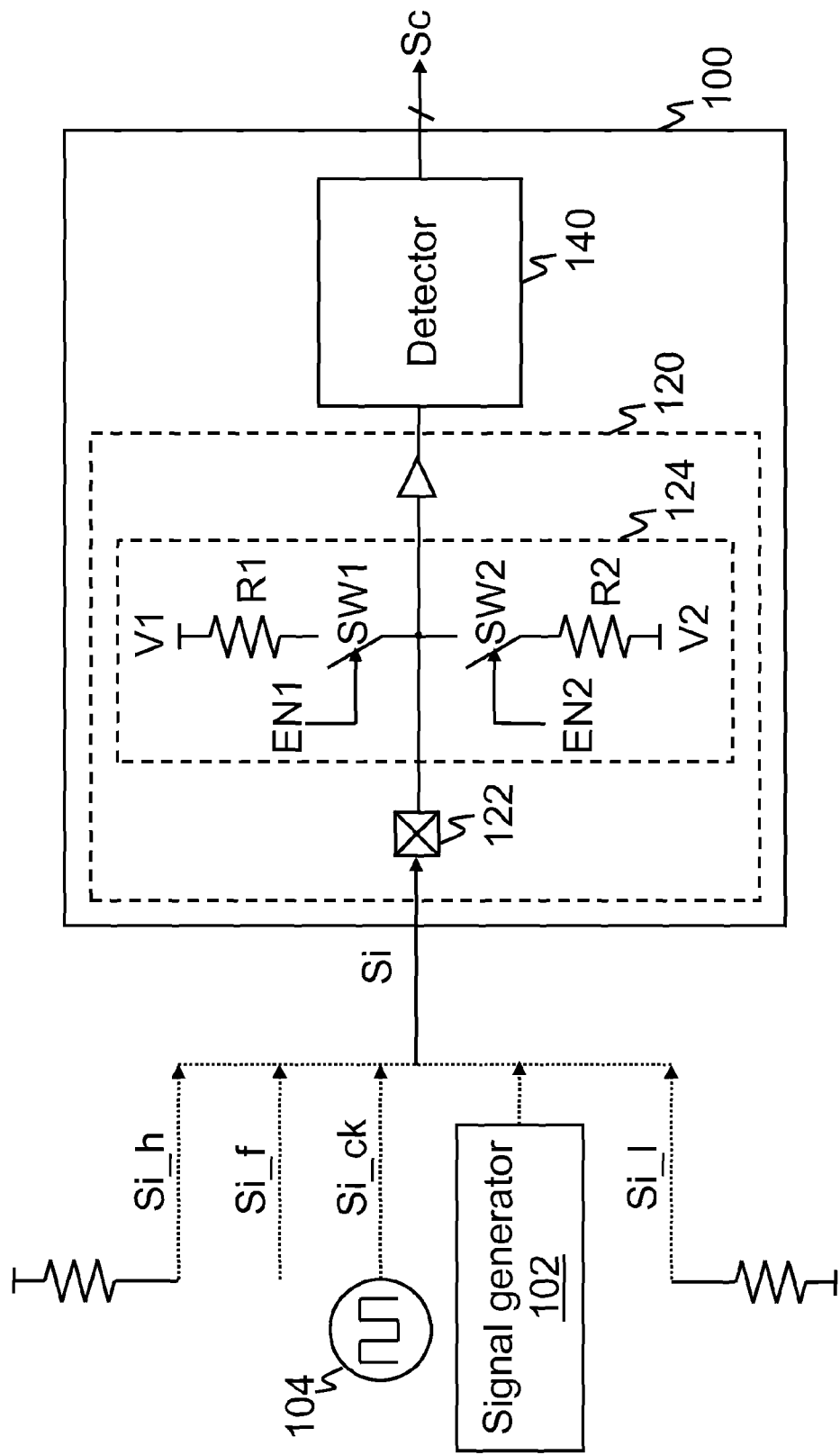
FIG. 2 is a schematic diagram of configuration setting device of integrated circuit receiving different types of input signals according to an embodiment of the present invention.

Referring to FIG. 2, when the input signal Si is a floating signal Si_f (for example, the pad 120 is at floating state), the detector 140 would output the corresponding configuration signal Sc based on the voltage signal V1 or V2 outputted by the voltage output unit 124. When the input signal Si is a clock signal Si_ck, the detector 140 would output the corresponding configuration signal Sc based on the clock signal Si_ck received at the signal receiving terminal 122. In other words, the level at the signal receiving terminal 122 detected by the detector 140 is corresponding to the level of the input signal Si (that is, a clock signal Si_ck), so as to output the corresponding configuration signal Sc based on the level of the clock signal Si_ck. Herein, the pad 120 is coupled with an oscillator 104 generating a clock signal Si_ck to the pad 120 during configuration setting of integrated circuit. When the input signal Si is a high level signal Si_h, the detector 140 would output the configuration signal Sc based on the high level signal Si_h received at the signal receiving terminal 122. In other words, the level at the signal receiving terminal 122 detected by the detector 140 is corresponding to the level of the input signal Si (that is a high level signal Si_h), so as to output a corresponding configuration signal Sc based on the level of the high level signal Si_h. Herein, the pad 120 is electrically connected to a voltage source, so as to generate the high level signal Si_h to the pad 120 during the configuration setting of integrated circuit. When the input signal Si is a low level signal Si_l, the detector 140 would output a configuration signal Sc based on the low level signal Si_l. In other words, the signal level at the signal receiving terminal 122 detected by the detector 140 is corresponding to the level of the input signal Si (that is a low level signal Si_l), so as to output a corresponding configuration signal Sc based on the level of the low level signal Si_l. Herein, the pad 120 is electrically connected to the ground wiring, so as to generate a low level signal Si_l through the ground wiring to the pad 120 during the configuration setting of integrated circuit. Moreover, it could employ a signal generator 102 to generate the required input signal Si. Furthermore, the signal generator 102 could generate a signal converted from high voltage to low voltage, or a signal converted from low voltage to high voltage in an arbitrary form, that is, generating a level conversion signal in an arbitrary form. Namely, the present invention could also be implemented by using a level conversion signal as an input signal for configuration.

Because the voltage signals V1, V2 generated by voltage output unit 124 belong to the weak voltage signals, and the signal inputted at the signal receiving terminal 122 (such as a clock signal Si_ck, a high level signal Si_h, a low level signal Si_l, or a level conversion signal) belongs to the strong voltage signal, when the signal receiving terminal 122 is at floating state, the signal level at the signal receiving terminal 122 detected by the detector 140 is the level of the voltage signal; on the contrary, when the signal receiving terminal 122 received a signal (for example a clock signal Si_ck, a high level signal Si_h, a low level signal Si_l, or a level conversion signal), the signal level at the signal receiving terminal 122 detected by the detector 140 would be the level of the received signal, not affected by voltage signals V1, V2.

Figure 3:
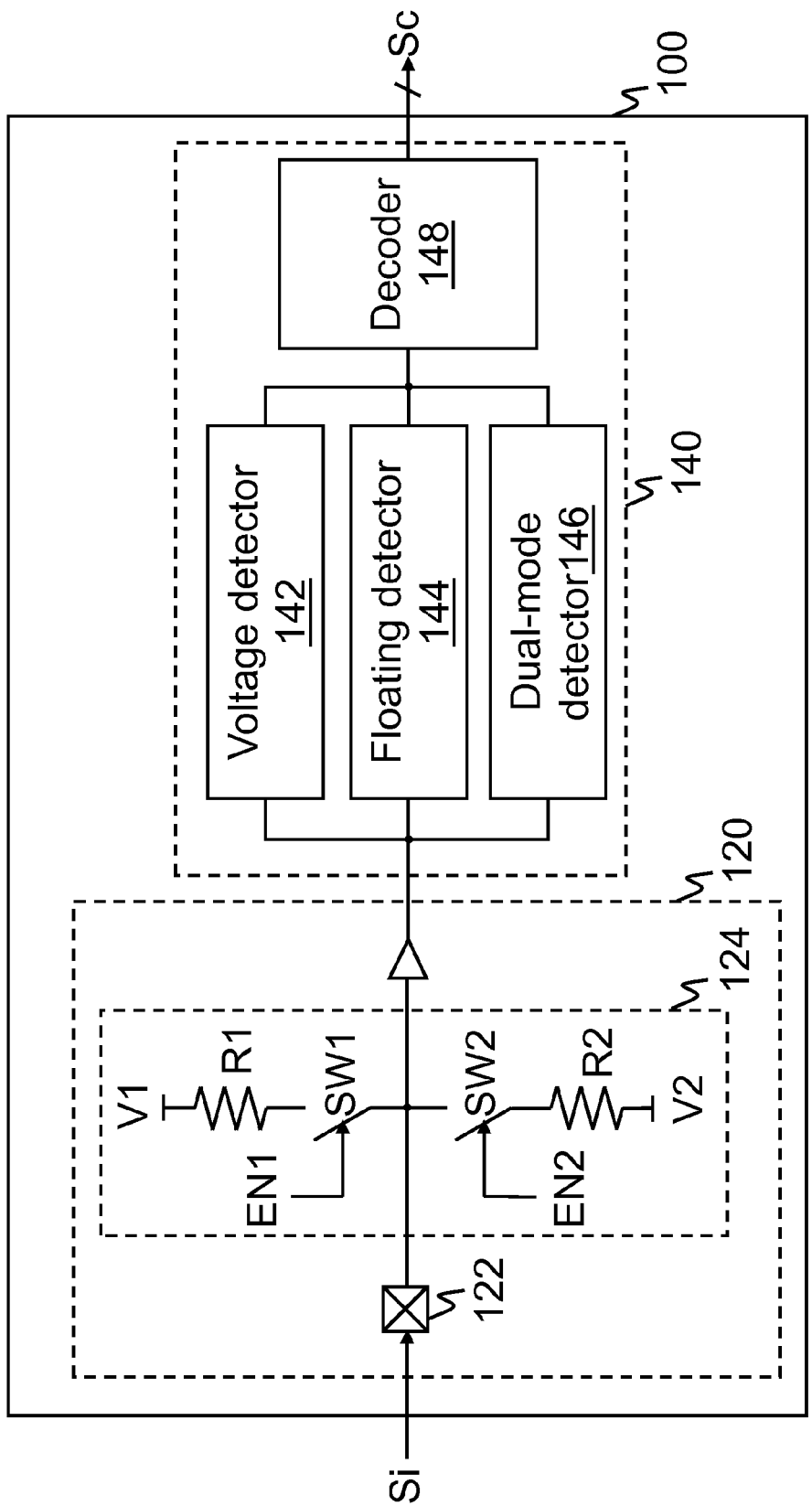
FIG. 3 is a block schematic diagram for a detector in an configuration setting device of integrated circuit according to an embodiment of the present invention.

Referring to FIG. 3, according to one embodiment of the present invention, the detector 140 comprises a voltage detector 142, a floating detector 144, a dual-mode detector 146, and a decoder 148. The voltage detector 142 is coupled with the pad 120 for detecting voltage signal. The floating detector 144 is coupled with the pad 120 for detecting the floating signal. The dual-mode detector 146 is coupled with the pad 120 for detecting the clock signal. The decoder 148 is coupled with the voltage detector 142, the floating detector 144 and the dual-mode detector 146 for decoding the detection results from the voltage detector 142, the floating detector 144 and the dual-mode detector 146 to generate a configuration signal Sc.

Figure 4:
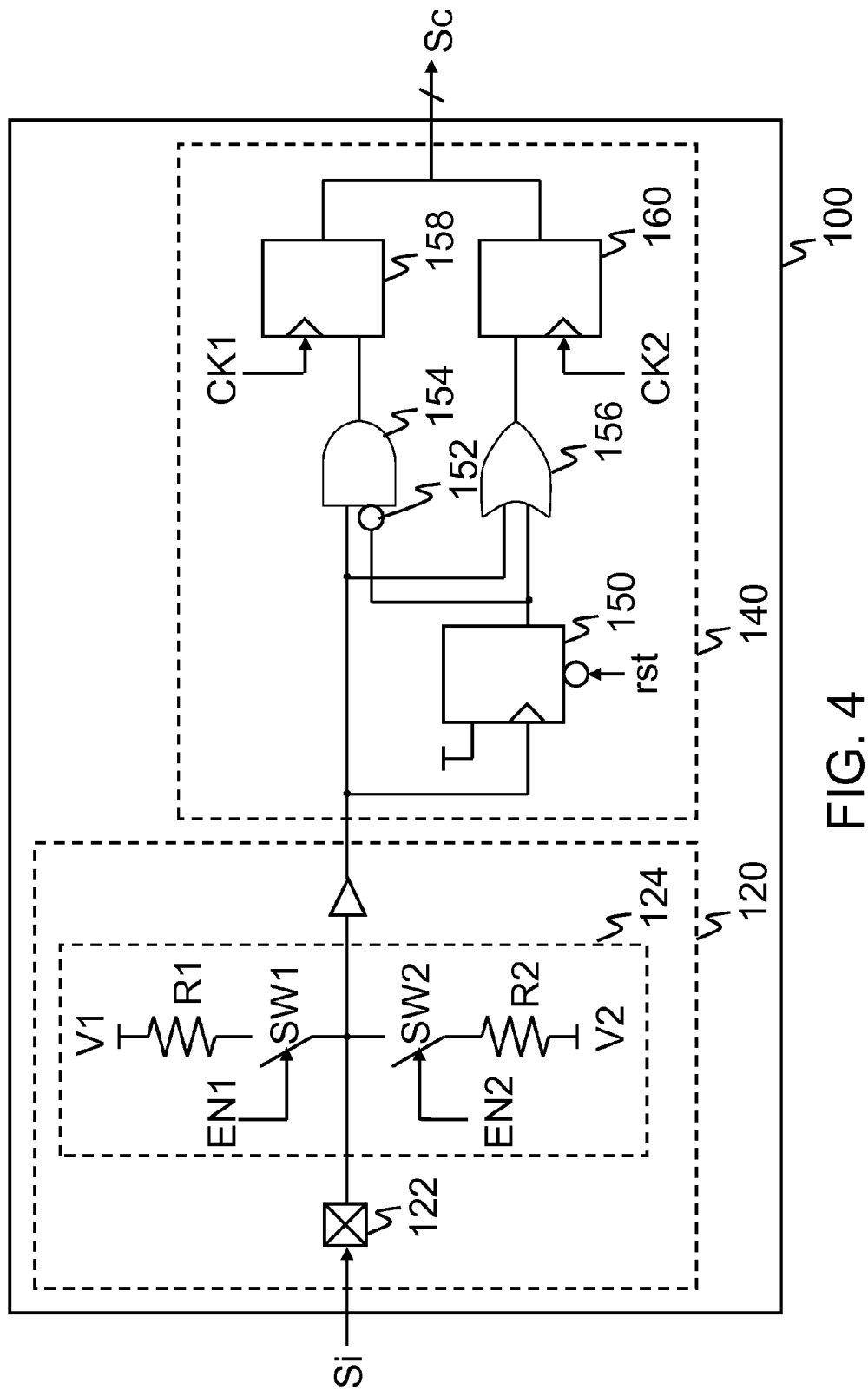
FIG. 4 is a detailed circuit diagram for a detector in an configuration setting device of integrated circuit according to an embodiment of the present invention.

The detector could be implemented with a plurality of logic elements. Referring to FIG. 4, in an embodiment, the detector 140 comprises a first flip-flops 150, an inverter 152, an AND gate 154, an OR gate 156, a second flip-flops 158 and a third flip-flops 160, and the connection relationship could be referred to FIG. 4. Herein, by inputting a reset signal rst to the reset end of the first flip-flops 150, it could control the detection time of the detector 140.

Figure 5:
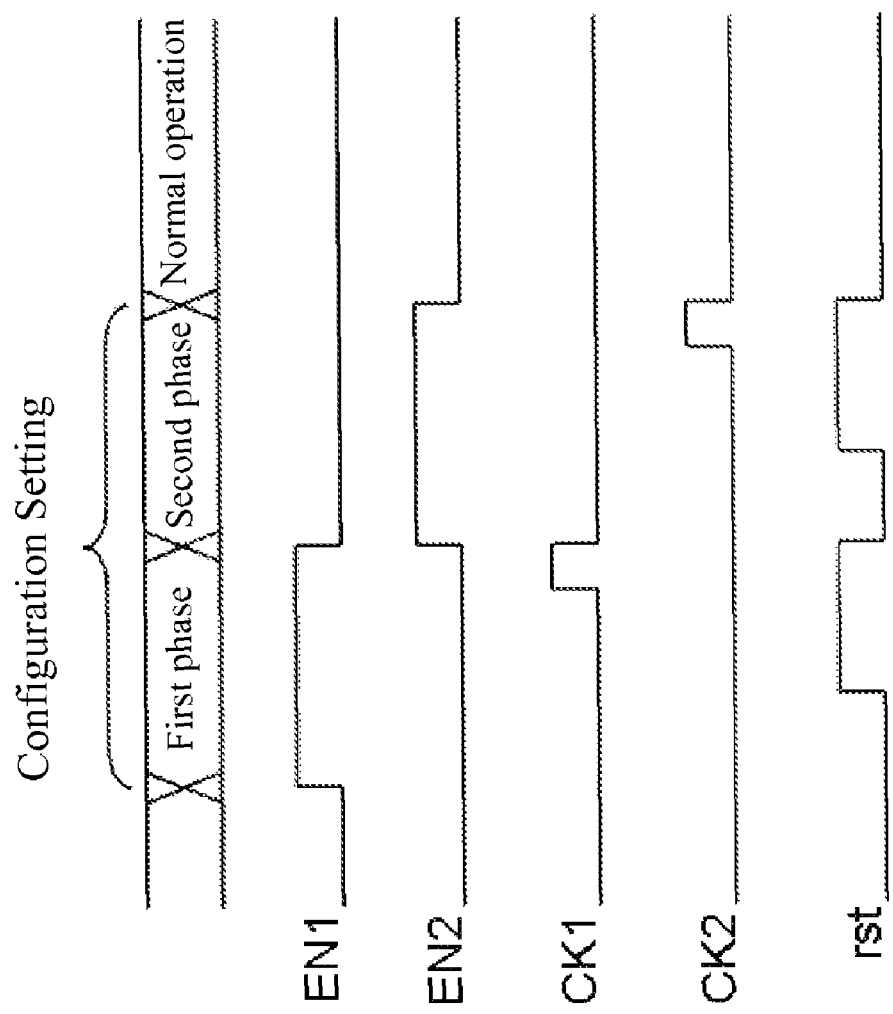
FIG. 5 is an operation timing diagram of an configuration setting device of integrated shown in FIG. 4; and, FIG. 6 is a flow diagram of an configuration setting method of integrated circuit according to an embodiment of the present invention.

Referring to FIG. 5, it shows an operation timing diagram for the configuration setting device of integrated circuit as shown in FIG. 4. Herein, the configuration setting time could be divided into a first phase and a second phase. During the first phase, the enable signal EN1 is "1", and the enable signal EN2 is "0". In the beginning, the first clock CK1, the second clock CK2, and the reset signal rst are all "0"s; after a period of time, the reset signal rst would be converted from "0" to "1"; finally, the first clock CK1 would be converted from "0" to "1", so as to enable the output of the second flip-flops 158 outputting an 1-bit configuration signal. During the second phase period, the enable signal EN1 is "0", and the enable signal EN2 is "1"; in the beginning, the first clock CK1, the second clock CK2 and the reset signal rst are all "0"s; after a period of time, the reset signal rst would be converted from "0" to "1"; finally, the second clock CK2 would be converted from "0" to "1", so as to enable the output terminal of the third flip-flops 160 outputting an 1-bit configuration signal. Therefore, when the input signal is a floating signal, the 1-bit configuration signal outputted from the output terminal of the second flip-flops 158 is "1", and the 1-bit configuration signal outputted from the output terminal of the third flip-flops 160 is "0". When the input signal is a clock signal, the 1-bit configuration signal outputted from the output terminal of the second flip-flops 158 is "0", and the 1-bit configuration signal outputted from the output terminal of the third flip-flops 160 is "1". When the input signal is a high level signal, the 1-bit configuration signal outputted from the output terminal of the second flip-flops 158 is "1", and the 1-bit configuration signal outputted from the output terminal of the third flip-flops 160 is "1". When the input signal is a low level signal, the 1-bit configuration signal outputted from the output terminal of the second flip-flops 158 is "1", and the 1-bit configuration signal outputted from the output terminal of the third flip-flops 160 is "0". These regulation signals, that is enable signal EN1, EN2, first clock CK1, second clock CK2 and reset signal rst, could be from the original signal generator in the integrated circuit, and also could be generated by a control module.

Figure 6:
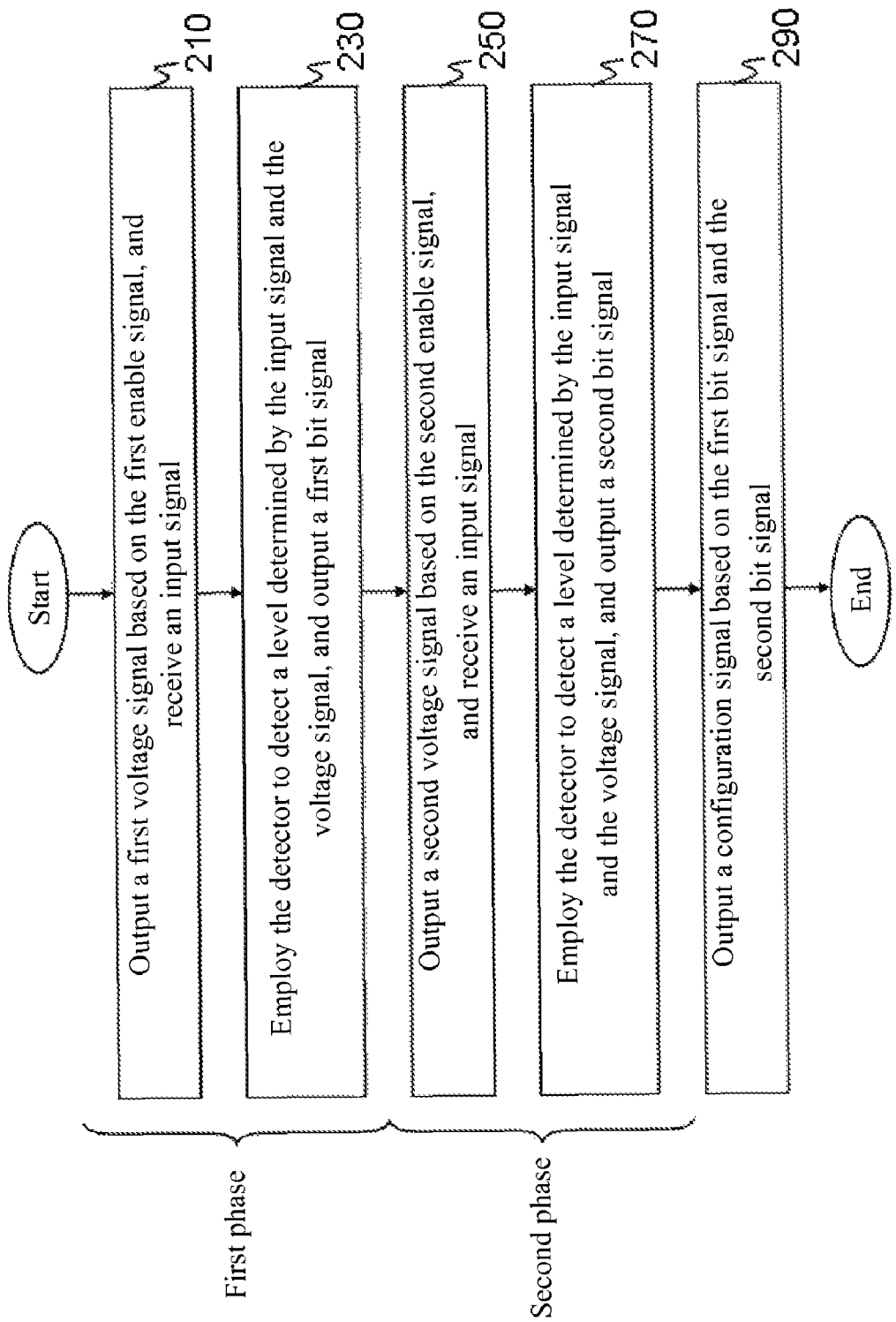

Referring to FIG. 6, it is a configuration setting method of integrated circuit according an embodiment of the present invention. The configuration setting time could be divided into a first phase and a second phase. During the two phase periods, it could generate the corresponding bit signal according to the received input signal or the generated voltage signal, so as to output a configuration signal. During the first phase period, it first outputs a first voltage signal based on the first signal, and receives the input signal (Step 210); next, employing a detector to detect the level determined by the input signal and the voltage signal, so as to output a first bit signal (Step 230); after the first phase period, that is a second phase period, during the second phase period, it first outputs a second voltage signal based on the second signal, and receives the input signal (Step 250); and, employing the detector to detect the level determined by the input signal and the voltage signal, so as to output the second bit signal (Step 270); thus, outputting a configuration signal based on the first bit signal and the second bit signal (Step 290); wherein, the levels of the voltage signal are different in the first phase period from the second phase period; furthermore, after the two phases, the outputted configuration signal could be an at least 2-bit configuration signal.

Because the voltage signal generated by voltage output unit 124 is a weak voltage signal, and the signal inputted at the signal receiving terminal is a strong voltage signal, when there is no input signal (for example, the input signal is a floating signal), the detected level is the level of the voltage signal; on the contrary, when there is a signal input at the signal receiving terminal (for example, the input signal is a clock signal, a high level signal, a low level signal, or a level conversion signal), the level detected by the detector is the level of the input signal.

Taking an example with FIG. 5, the first voltage signal is "1", and the second voltage signal is "0". When the input signal is a floating signal (that is, the signal receiving terminal is at floating state, no signal input), during the first phase period, it would output a configuration signal "1" based on the first voltage signal (Step 232); and, during the second phase period, it would output a configuration signal "0" based on the second voltage signal. When the input signal is a clock signal (that is, the signal receiving terminal received a clock signal), during the first phase and the second phase periods, it would output the configuration signal "0", "1" based on the clock signal, respectively. When the input signal is a high level signal (that is, the signal receiving terminal received a high level signal), during the first phase and the second phase periods, it would output the configuration signal "1", "1" based on the high level signal. When the input signal is a low level signal (that is, the signal receiving terminal received a low level signal), during the first phase and the second phase periods, it would output the configuration signal "0", "0" based on the low level signal. And, when the input signal is a level conversion signal (that is, the signal receiving terminal received a level conversion signal), during the first phase and the second phase periods, it would output a configuration signal based on the current level of the level conversion signal.

The configuration setting method of integrated circuit according to one embodiment of the present invention could be applied to a single pin of integrated circuit. For example, it could be implemented with the configuration setting device as shown in FIG. 1. With the present invention, it only needs to input different input signals to generate four types of 2-bit configuration signals, so as to at least reduce a half of number of pins. Moreover, the present invention could also increase the types of input signals to increase the number of bits for configuration signal. Furthermore, it could employ the floating and clock signal as input signal, so as to reduce the resistors required for providing supply voltage or ground voltage. Thus, the present invention could reduce the manufacturing cost of integrated circuit.

The present invention has been described in details with the embodiments as above, and these disclosed embodiments are not used to limit the scope of the present invention. The skilled in the art could have some changes and modification without departing from the spirit of the present invention, which should be all covered in the scope of the present invention. Thus, the patent protection scope for the present invention should be defined by the attached claims of the application.

What is claimed is:

1. A configuration setting device of an integrated circuit, comprising:

a signal receiving terminal, for receiving an input signal;

a voltage output unit, coupled to the signal receiving terminal, for outputting a voltage signal at the signal receiving terminal according to an enable signal; and a detector, coupled to the signal receiving terminal, for detecting a signal level at the signal receiving terminal and outputting a configuration signal according to the signal level;

wherein the input signal is generated outside of the configuration setting device of the integrated circuit, the voltage signal is generated inside of the configuration setting device of the integrated circuit, and the signal level is determined by the input signal or the voltage signal at the signal receiving terminal;

wherein the configuration signal is an at least 2-bit configuration signal; and wherein the input signal is operating within a first voltage range, the voltage signal is operating within a second voltage and the first voltage range is larger than the second voltage range.

2. The configuration setting device according to claim 1, wherein when the input signal is a floating signal, the signal level at the signal receiving terminal is corresponding to the level of the voltage signal.

3. The configuration setting device according to claim 2, wherein when the input signal is a non-floating signal, the signal level at the signal receiving terminal is corresponding to the level of the input signal.

4. The configuration setting device according to claim 3, wherein the non-floating signal is a clock signal, a direct current signal or a level conversion signal.

5. The configuration setting device according to claim 1, wherein the detector includes at least one flip-flops and at least one logic gate.

6. The configuration setting device according to claim 1, further comprises:
a control module, coupled to the voltage output unit and the detector to output the enable signal.

7. The configuration setting device according to claim 6, further comprises:
a buffer, coupled between the signal receiving terminal and the detector, for buffering the level at the signal receiving terminal.

8. The configuration setting device according to claim 1, wherein the voltage output unit comprises:
a first resistor;
a first switch, coupled between the signal receiving terminal and the first resistor, in which the first switch is controlled by a first signal of the enable signal;
a second resistor; and
a second switch, coupled between the signal receiving terminal and the second resistor, in which the second switch is controlled by a second signal of the enable signal.

9. The configuration setting device according to claim 1, wherein the detector is used to output a first bit signal of the configuration signal during a first phase period, and to output a second bit signal of the configuration signal during a second phase period.

10. An configuration setting method of an integrated circuit, comprising:
receiving an input signal from outside of the integrated circuit;
generating a voltage signal inside of the integrated circuit;
detecting a signal level determined by the input signal or the voltage signal during a first phase period to output a first bit signal;
detecting the signal level determined by the input signal or the voltage signal during a second phase period to output a second bit signal; and
outputting a configuration signal according to the first bit signal and the second bit signal;
wherein the signal level of the voltage signal in the first phase period and in the second phase period is different; and
wherein the input signal is operating within a first voltage range, the voltage signal is operating within a second voltage and the first voltage range is larger than the second voltage range.

11. The configuration setting method according to claim 10, wherein when the input signal is a floating signal, the signal level is corresponding to the level of the voltage signal.

12. The configuration setting method according to claim 11, wherein when the input signal is a non-floating signal, the signal level is corresponding to the level of the input signal.

13. The configuration setting method according to claim 10, wherein the non-floating signal is a clock signal, a direct current signal or a level conversion signal.

14. The configuration setting method according to claim 10, wherein the step of generating the voltage signal includes employing a first enable signal and a second enable signal to control a first switch and a second switch, respectively, to output the voltage signal.

15. The configuration setting method according to claim 10, wherein the configuration signal is an at least 2-bit configuration signal.

* * * * *